(12) United States Patent
Barton

(10) Patent No.: US 9,047,857 B1
(45) Date of Patent: Jun. 2, 2015

(54) VOICE COMMANDS FOR TRANSITIONING BETWEEN DEVICE STATES

(71) Applicant: Rawles LLC, Wilmington, DE (US)

(72) Inventor: William F. Barton, Harvard, MA (US)

(73) Assignee: Rawles LLC, Wilmington, DE (US)

( * ) Notice: Subject to any disclaimer, the term of this patent is extended or adjusted under 35 U.S.C. 154(b) by 244 days.

(21) Appl. No.: 13/720,792

(22) Filed: Dec. 19, 2012

(51) Int. Cl.
G10L 15/00 (2013.01)
G10L 15/20 (2006.01)
G10L 19/00 (2013.01)

(52) U.S. Cl.
CPC ........................................ *G10L 19/00* (2013.01)

(58) Field of Classification Search
USPC .................. 704/231–257, 270–275
See application file for complete search history.

(56) References Cited

U.S. PATENT DOCUMENTS

| | | | |
|---|---|---|---|
| 5,640,490 A * | 6/1997 | Hansen et al. ............... | 704/254 |
| 6,212,541 B1 * | 4/2001 | McAuliffe et al. ........... | 718/100 |
| 6,718,307 B1 * | 4/2004 | Buil et al. ..................... | 704/270 |
| 6,813,341 B1 * | 11/2004 | Mahoney ................... | 379/88.01 |
| 7,418,392 B1 | 8/2008 | Mozer et al. | |
| 7,720,683 B1 | 5/2010 | Vermeulen et al. | |
| 7,769,593 B2 * | 8/2010 | Venkataraman et al. ..... | 704/275 |
| 7,774,204 B2 | 8/2010 | Mozer et al. | |
| 8,452,597 B2 * | 5/2013 | Bringert et al. ............... | 704/251 |
| 2006/0085199 A1 * | 4/2006 | Jain .............................. | 704/275 |
| 2012/0223885 A1 | 9/2012 | Perez | |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jesse Pullias
(74) *Attorney, Agent, or Firm* — Lee & Hayes, PLLC

(57) ABSTRACT

Techniques for transitioning an electronic device between device states. In one example, a voice-controlled device is configured to transition from a sleep state to an awake state in response to identifying a user speaking a predefined utterance. The techniques may determine whether the user has spoken the predefined utterance with reference to traditional speech-recognition techniques, as well as with reference to changes in the volume of a user's voice.

26 Claims, 6 Drawing Sheets

US 9,047,857 B1

VOICE COMMANDS FOR TRANSITIONING BETWEEN DEVICE STATES

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

When interacting with a device through speech, a device may perform automatic speech recognition (ASR) on audio signals generated from sound captured within an environment for the purpose of identifying voice commands within the signals. In some instances, a predefined word or phrase may be used to awaken the device or otherwise transition the device from one state to another state. In these instances, the device needs to accurately recognize the predefined word or phrase in order to transition in this manner.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
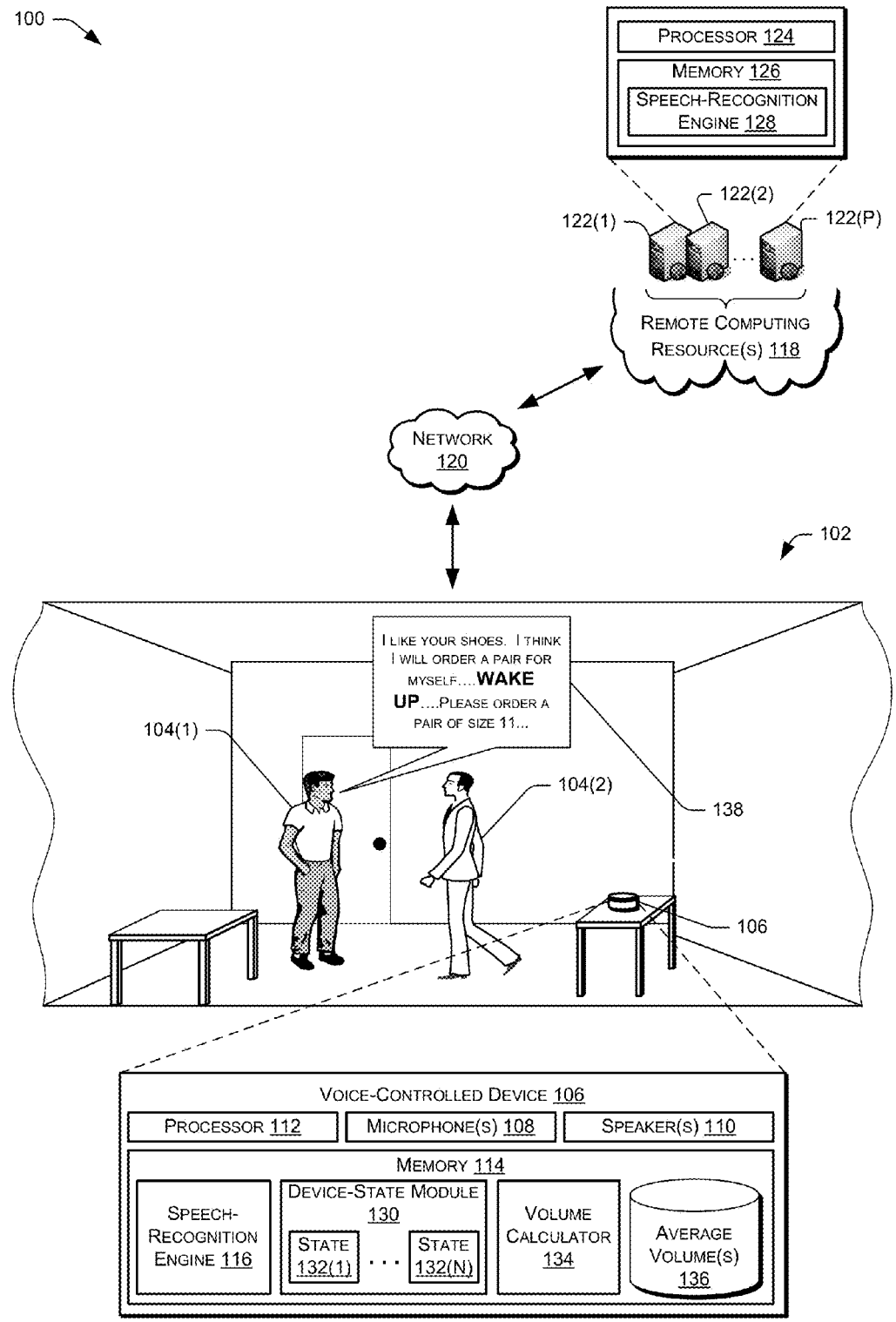
FIG. 1 shows an illustrative voice interaction computing architecture set in a home environment. The architecture includes a voice-controlled device physically situated in the home, along with a user who wishes to provide a command to the device. In this example, the user attempts to gain the attention of the device by speaking a predefined phrase ("Wake up"). In this example, the device performs speech recognition to identify the predefined phrase, and also determines that the user has raised his voice when speaking this phrase. Because the user has raised his voice when speaking the phrase, the device may adjust (e.g., increase) the calculated likelihood that the user has in fact spoken the predefined phrase.

This disclosure describes, in part, techniques for transitioning an electronic device between device states. In one example, a voice-controlled device is configured to operate in at least two different states. In a first state, a microphone unit of the device captures sound from an environment in which the device resides, generates corresponding audio signals, and then locally performs automatic speech recognition (ASR) on the audio signals. The device then compares results of the ASR to a predefined utterance (e.g., a word or phrase) that, upon recognition of, causes the device to transition from the first state to a second state.

In the second state, the device is configured to provide audio signals generated based on sound captured in the environment to a network-based computing platform. Computing resources of the network-based computing platform then perform ASR on the audio signals to identify a broad array of commands from speech indicated by the audio signals. Upon identifying a command, the computing resources of the platform may provide an instruction and/or content back over the network to the device, which may output audio to the user in response.

As described above, the device may transition from the first state to the second state in response to identifying a predefined word or phrase. That is, the device may transition from the first state to the second state in response to identifying user speech that has a similarity to the predefined word or phrase that is greater than a threshold. As described in detail below, the device may adjust (e.g., increase or decrease) a calculated similarity between user speech and the predefined word or phrase based on a user's change in volume level. For instance, if a user increases the volume of her voice when speaking the utterance that the device has determined may represent the predefined word or phrase, the device may increase the calculated similarity score and, hence, may increase a calculated likelihood that the user did indeed utter the predefined word or phrase.

For instance, envision that a voice-controlled device is configured to transition from the first state to the second state in response to the user saying the phrase "wake up". Envision further that the user states the following when proximate to a voice-controlled device: "That is one of my favorite songs and I'll turn it on for us . . . Wake up . . . please play "Let it Be" by the Beatles." In this example, the device captures sound including this entire statement, generates a corresponding audio signal, and performs ASR on the signal. In this example, the device may compare each portion of the speech to the predefined utterance, "wake up". In this example, the device may calculate a very high similarity between the portion of the utterance in which the user states "wake up" and the predefined phrase "wake up".

In addition, the device may analyze a volume level to alter this calculated similarity score. For instance, the device may determine that the user raised her voice when saying "wake up" relative to the words spoken by the user before this phrase (e.g., "That is one of my favorite songs and I'll turn it on for us") and/or words spoken by the user after the phrase (e.g., "Please play . . . "). The device may adjust (e.g., increase) a calculated similarity between the spoken phrase ("wake up") and the predefined phrase ("wake up"). As such, the device increases the likelihood that it will transition to a different state as the user requests based on the increase in the user's volume when speaking the phrase "wake up", relative to the other portions of the user's speech. The techniques described herein thus intuitively infer that a user is more likely to be trying to gain the attention of the device if the user raises his voice relative to the volume of the user's voice when engaging in "regular" conversation with other users in the environment. Conversely, the techniques infer that a user engaging in "regular" conversation will maintain a relatively constant volume level (e.g., one user asking another user "what time did you wake up this morning?" at a constant volume level). As described herein, determining volume levels of user speech may include determining energy levels of the speech, decibel levels of the speech, power levels of the speech, or any other type of measurement indicative of how loud a user is speaking or attempting to speak within an environment.

In addition, while the volume information may be used to adjust a calculated similarity between an utterance and the predefined phrase, the volume information may also be used directly in the calculation of the initial similarity. That is, the volume level of the user's speech may be combined with traditional speech recognition techniques to determine whether to designate the user's utterance as the predefined utterance. In another example, the techniques may calculate a first similarity, and then calculate a second, "new" similarity based on the first similarity and the volume information associated with the utterance. This second similarity may then be compared to a threshold to determine whether or not the user spoke the predefined utterance (e.g., using machine learning techniques, neural networks, support vector machine (SVMs), etc.).

The devices and techniques described above and below may be implemented in a variety of different architectures and contexts. One non-limiting and illustrative implementation is described below.

FIG. 1 shows an illustrative voice interaction computing architecture 100 set in a home environment 102 that includes users 104(1) and 104(2) ("the users 104"). The architecture also includes an electronic voice-controlled device 106 with which the users 104 may interact. In the illustrated implementation, the voice-controlled device 106 is positioned on a table within a room of the home environment 102. In other implementations, it may be placed in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has a microphone unit 108 that includes at least one microphone and a speaker unit 110 that includes at least one speaker to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 6.

The microphone unit 108 of the voice-controlled device 106 detects audio from the environment 102, such as sounds uttered from the users 104, and generates a corresponding audio signal. As illustrated, the voice-controlled device 106 includes a processor 112 and memory 114, which stores or otherwise has access to a speech-recognition engine 116. As used herein, a processor may include multiple processors and/or a processor having multiple cores. The speech-recognition engine 116 performs speech recognition on audio signals generated by the microphone unit, such as utterances spoken by the user 104. The voice-controlled device 106 may perform certain actions in response to recognizing different speech from the user 104. The user may speak predefined commands (e.g., "Wake up", "Sleep", etc.), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 12(1), 122(2), . . . , 122(P) and may, in some instances, form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing devices 118 include "on-demand computing", "software as a service (SaaS)", "platform computing", "network-accessible platform", "cloud services", "data centers", and so forth.

The servers 122(1)-(P) include a processor 124 and memory 126, which may store or have access to a speech-recognition engine 128 for receiving audio signals from the device 106, recognizing speech and, potentially, causing performance of an action in response. In some instances, as described below, the voice-controlled device 106 may upload audio signals to the remote computing resources 118 for processing, given that the remote computing resources 118 may have a computational capacity that far exceeds the computational capacity of the voice-controlled device 106. Therefore, the voice-controlled device 106 may utilize the speech-recognition engine 128 at the remote computing resources 118 for performing relatively complex analysis on audio captured from the environment 102.

Regardless of whether the speech recognition occurs locally or remotely from the environment 102, the voice-controlled device 106 may receive vocal input from the users 104 and the device 106 and/or the resources 118 may perform speech recognition to interpret a user's operational request or command. The requests may be for essentially any type of operation, such as authentication, database inquires, requesting and consuming entertainment (e.g., gaming, finding and playing music, movies or other content, etc.), personal management (e.g., calendaring, note taking, etc.), online shopping, financial transactions, and so forth.

The voice-controlled device 106 may communicatively couple to the network 120 via wired technologies (e.g., wires, USB, fiber optic cable, etc.), wireless technologies (e.g., RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 114 of the voice-controlled device 106 stores or otherwise has access to the speech recognition engine 116, as well as a device-state module 130 configured to transition the device 106 between different device states. For instance, the device-state module 130 may transition the device 106 from a state in which the speech-recognition engine 116 is performing ASR locally to identify a predefined utterance (e.g., word, phrase, etc.) to a state in which the device 106 provides the audio signals to the remote computing resources 118 for performing ASR thereon.

In order to identify the predefined utterance (e.g., "wake up"), the speech recognition engine 116 performs ASR on the generated audio signals and calculates a similarity between any speech identified therein and the predefined utterance. The engine 116 then compares this similarity to a threshold and, if the similarity is greater than the threshold, the engine 116 determines that the user has uttered the predefined utterance. In response, the device-state module 130 transitions the device 106 from a first state 132(1) to a second state 132(N). For instance, the engine 116 may begin providing audio signals generated from sound captured within the environment 102 to the remote computing resources 118 when in the second state 132(N). The speech recognition engine 116, as well as the speech recognition engine 128, may utilize any type of speech recognition techniques. For instance, one or both of these engines may utilize large-vocabulary speech recognition techniques, keyword spotting techniques, machine-learning techniques (e.g., support vector machines (SVMs)), neural network techniques, or the like.

In some instances, the device-state module 130 adjusts a similarity score (or otherwise adjusts a likelihood that the device 106 will transition to a different state) based on a volume of the user's speech when speaking within the environment 102. As illustrated, the memory 114 may store a volume calculator 134 that calculates different average volumes corresponding to different portions of speech from the users 104. The volume calculator 134 may store these average volumes 136 in a datastore for reference by the device-state module 130.

In one example, the volume calculator 134 may maintain a running average of a user's volume of speech for a predetermined amount of time (e.g., a number of seconds, milliseconds, etc.). In addition, when a particular portion of speech is determined by the speech-recognition engine 116 as having a similarity to the predefined utterance that is greater than a threshold, the volume calculator 134 may calculate and store an average volume of this portion of speech. Thereafter, the device-state module 130 may compare the average volume of this portion of speech to the average volume of the user's speech prior to that portion. Then, the device-state module 130 alter (e.g., increase or decrease) a similarity score for the portion of speech that may contain the predefined utterance based on this volume differential. For instance, if the average volume of the particular portion of speech is greater than the previous average volume, greater by a threshold amount, or greater by some threshold percentage, then the device-state module 130 may increase the similarity score. By doing so, the device 106 is configured to take into account that a user may be likely to raise her voice when attempting to "wake up" the device 106.

To illustrate, FIG. 1 depicts the first user 104(1) stating the following: "I like your shoes. I think I will order a pair for myself . . . . WAKE UP . . . . Please order a pair of size 11 . . . ." In this example, the user 104(1) speaks with a first average volume when stating this portion of the speech: "I like your shoes. I think I will order a pair for myself". Thereafter, the user raises his voice when stating the predefined utterance for waking the device, "wake up". The volume calculator 134 may initially calculate an average volume of the user's speech when stating the first portion of the speech ("I like your shoes. I think I will order a pair for myself"). Thereafter, when the speech-recognition engine 116 determines that the similarity between the second portion of the speech ("wake up") and the predefined utterance ("wake up") is greater than a threshold, the engine 116 may instruct the volume calculator 134 to calculate an average volume of this portion of the speech.

In this example, the volume calculator 134 may determine that the calculate volume of the second portion of the speech is greater than the calculated volume of the first portion of the speech, given that the user 104(1) raised his voice when attempting to awaken the device 106. Given this increased volume, the speech-recognition engine 116 may adjust (e.g., increase or decrease) the similarity score between the second portion of speech and the predefined utterance, thereby increasing the likelihood that the speech recognition engine 116 will determine that the user 104(1) has indeed spoken the predefined utterance. The engine 116 may then compare this score to a threshold that, when met, causes the device-state module 130 to transition the device 106 from its current state to another state. For instance, the device 106 may transition from a state in which the device 106 performs ASR locally to identify the predefined utterance to a state in which the device 106 streams audio signals captured by the microphone unit 108 to the remote computing resources 118 for performing more complex speech recognition (e.g., to identify voice commands from the users 104).

Figure 2:
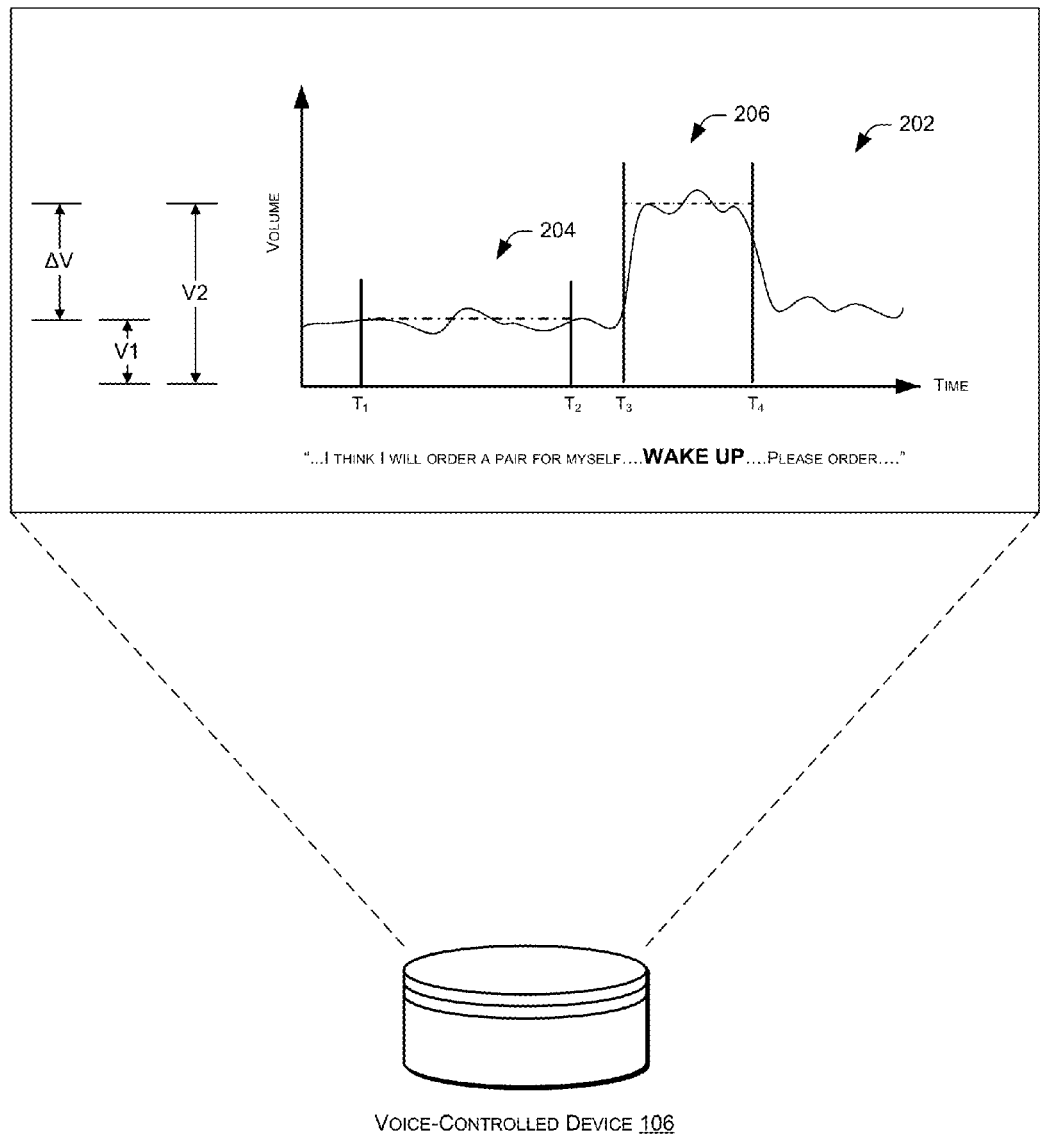
FIG. 2 illustrates an example audio signal when the user speaks the words illustrated in FIG. 1. As illustrated, the volume level of the audio signal increases when the user speaks the predefined phrase ("Wake up").

FIG. 2 illustrates an example audio signal 202 generated by the microphone unit 108 when the user 104(1) speaks the words illustrated in FIG. 1. As illustrated, the volume level of the audio signal 202 increases when the user speaks the predefined phrase ("Wake up"). That is, the user 104(1) generally speaks with a first volume when addressing the second user 104(2), before raising his voice when attempting to awaken the device 106.

As illustrated, the audio signal 202 includes a first portion 204 and a second portion 206, each of which represent a set of multiple frames of audio. The speech-recognition engine 116 may identify the second portion by comparing the user's speech in this portion ("wake up") to the predefined utterance ("wake up"). In this example, the engine 116 calculates a similarity between this portion of speech and the predefined utterance that is greater than a threshold. As such, the engine 116 may instruct the volume calculator 134 to determine an average volume of the user's speech during this second portion 206, which occurs from a time $t_3$ to a time $t_4$. As illustrated, the calculate 134 determines that the average volume corresponding to this portion 206 of the speech as "$V_2$". In some instances, the volume calculator does not include audio frames that do not include speech when calculating this average.

Furthermore, the volume calculator 134 may have been calculating the average volume of the user's speech over a sliding window, which may end just prior to the second portion 206. Here, for example, the volume calculator 134 has calculated an average volume of the first portion 204 of the user's speech as "$V_1$". Again, in some instances, the volume calculator does not include audio frames that do not include speech when calculating this average. After calculating both of these volumes, the volume calculator 134 may determine a differential between the respective volumes, illustrated as $\Delta V$, or may compare these volumes in any other manner. For instance, the volume calculator may compute a ratio between $V_2$ and $V_1$ and may alter a similarity score between the second portion 206 of speech and the predefined utterance based on this comparison. For instance, if the ratio is greater than a threshold, then the speech-recognition engine 116 may adjust (e.g., increase) this similarity score, thus increasing the likelihood that the device-state module 130 will transition the device from its current state to another state.

Furthermore, in some instances the volume calculator 134 may continually calculate two volume levels (e.g., $V_1$ and $V_2$). For instance, if the predefined word or phrase is known to take a certain length to typically speak (e.g., 1.5 seconds, etc.), then the volume calculator may continually calculate a volume of the most recent audio (e.g., the most recent 1.5 seconds) along with a volume of prior audio (e.g., a sliding window beginning at 3 seconds back in time). Then, when a particular portion of audio within the previous 1.5 seconds (in this example) is determined to have a similarity to the predefined word or phrase that is greater than a threshold, the device 106 may utilize the calculated volumes of the two sliding windows to adjust (e.g., increase or decrease) the similarity score or otherwise adjust the chances that the device will transition to a different state.

Figure 3:
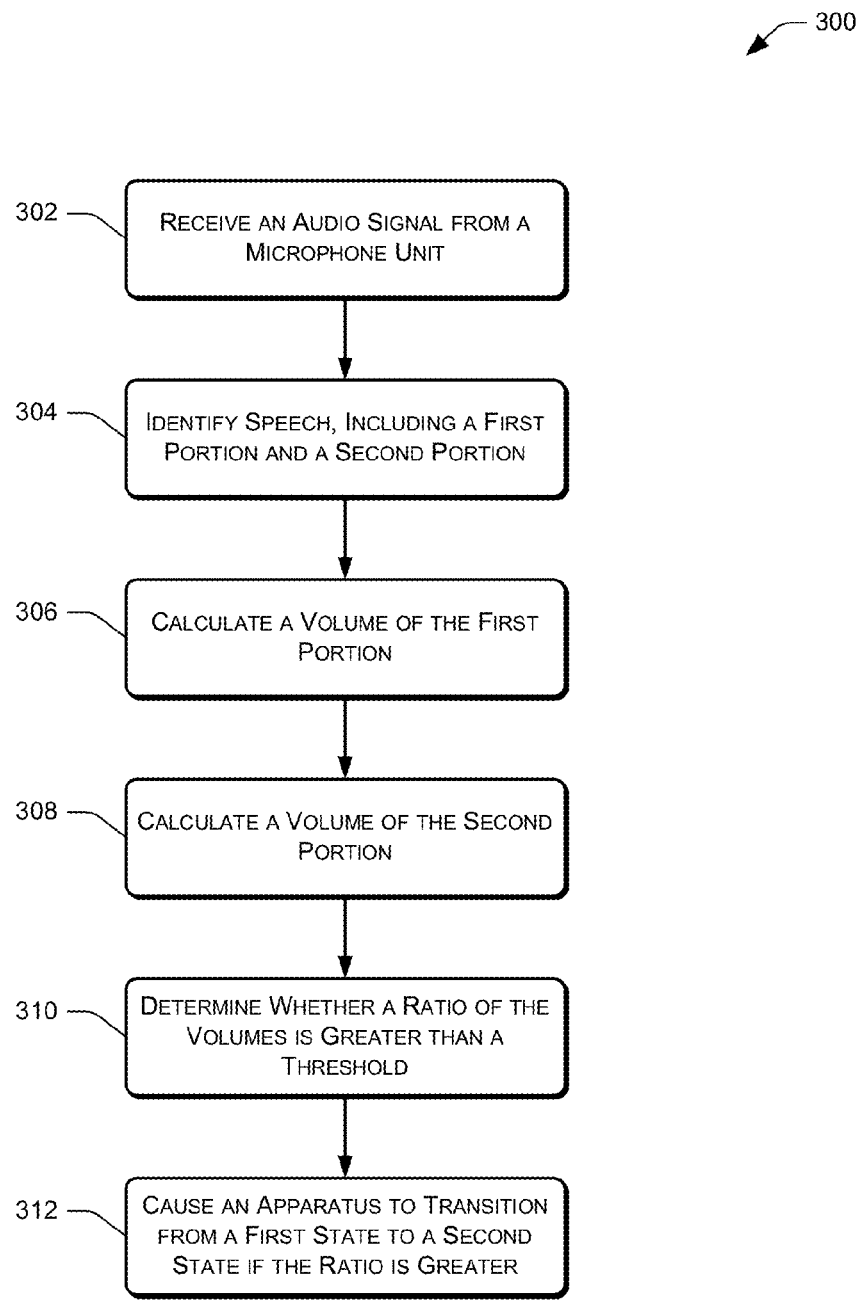
FIG. 3 illustrates a flow diagram of an example process for causing an apparatus to transition from one state to another at least in part due to a user raising her voice when speaking a predefined word or phrase.

FIG. 3 illustrates a flow diagram of an example process 300 for causing an apparatus, such as the voice-controlled device 106 of FIG. 1, to transition from one state to another at least in part due to a user raising her voice when speaking a predefined word or phrase. In some instances, the voice-controlled device 106 performs this process, although other computing devices or combinations thereof may perform some or all of the operations described below.

The process 300 (and each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, the process 300 receives an audio signal from a microphone unit, with the audio signal representing speech of a user. In this example, the audio signal may include a first portion that includes speech that does not include a predefined utterance, as well as a second, subsequent portion that does include the predefined utterance. As such, a speech-recognition engine may determine with some score or calculated confidence level that the second portion does indeed include the predefined utterance. For example, the speech-recognition engine may use an utterance-based model for the predefined utterance, and the utterance-based model may comprise one or more hidden Markov models (HMMs) and one or more Gaussian mixture models. At 304, the process 300 may identify the speech in the audio signal, including the first and second portions. In some instances, meanwhile, the process 300 does not identify the speech but only associates a score confidence level that the first and/or second portions include the predefined word or phrase. At 306, the process 300 calculates a volume of the first portion, which likely does not include the predefined utterance. At 308, meanwhile, the process 300 calculates a volume of the second portion, which may include the predefined utterance.

At 310, the process 300 may determine whether a ratio of the volume of the second portion to the volume of the first portion is greater than a threshold. By doing so, the process 300 effectively determines whether a user raised her voice by a certain amount when stating the speech that likely corresponds to the predefined utterance. At least partly in response to this ratio is greater than the threshold, at 312 the process 300 causes an apparatus to transition from a first state to a second state. In some instances, the process 300 adjusts (e.g., increases or decreases) the similarity score between the second portion of speech and the predefined utterance, such that it is more likely that the resulting score will be greater than a predefined threshold for designating the speech as including the predefined utterance. Of course, while the process 300 may reference a ratio between the respective volume levels of the first portion of speech and the second portion of speech, the process 300 may utilize the volume information in any other way when determining how or whether to adjust the calculated similarity. For instance, the process 300 may examine a raw increase in volume, a volume level of the second portion of speech, or any other information associated with the user's speech volume.

Figure 4:
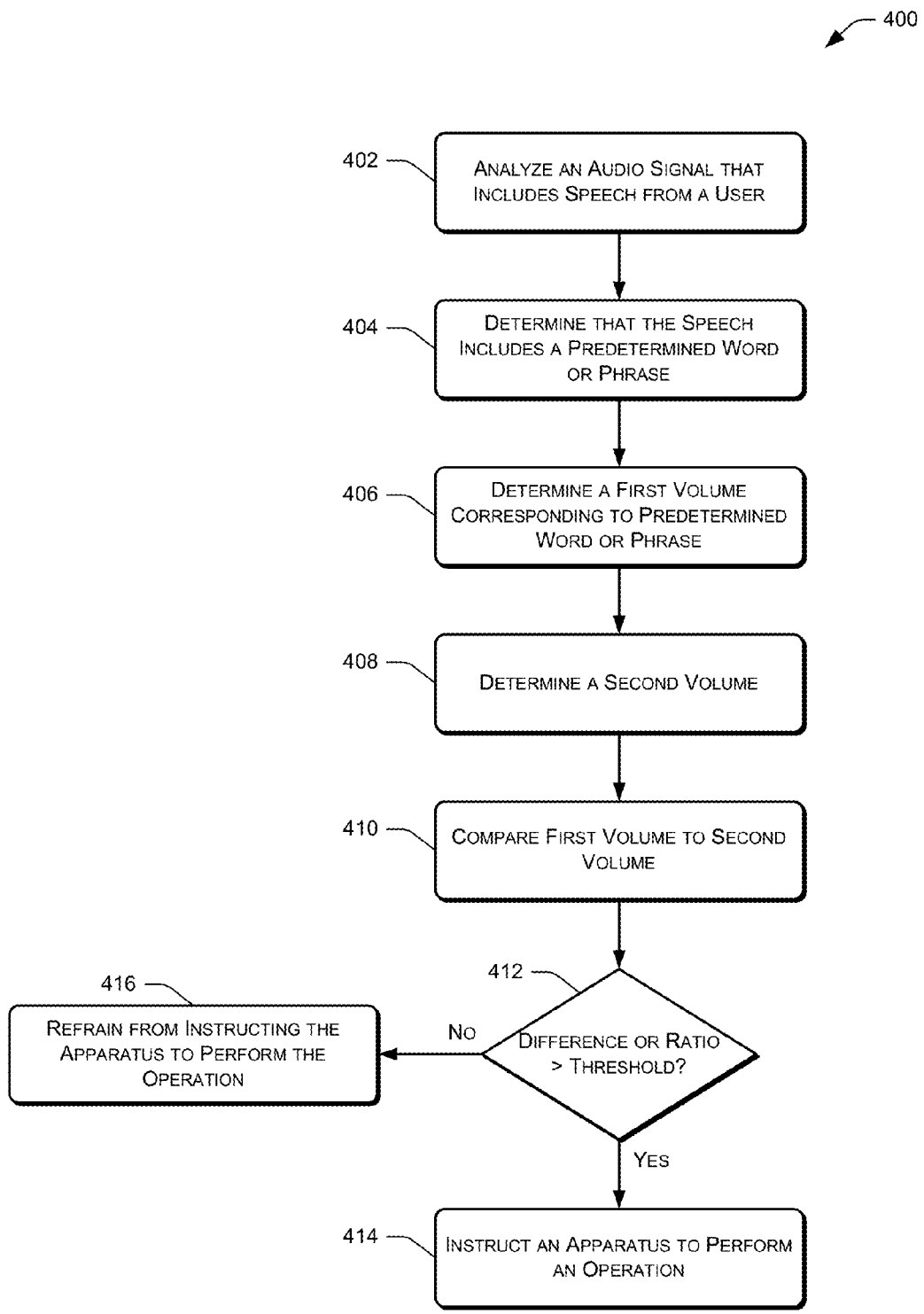
FIG. 4 illustrates a flow diagram of an example process for instructing an apparatus to perform an operation at least in part due to a user raising her voice when speaking a predefined word or phrase.

FIG. 4 illustrates a flow diagram of an example process 400 for instructing an apparatus to perform an operation at least in part due to a user raising her voice when speaking a predefined word or phrase. At 402, the process 400 analyzes an audio signal that includes speech from a user. At 404, the process 400 determines that the speech includes a predetermined word or phrase. In some instances, this operation refers to the process 400 determining that the similarity between a portion of the speech and the predetermined word or phrase is greater than a threshold similarity score. At 406, the process 400 determines a first volume of the speech that corresponds to the user speaking the predetermined word or phrase. At 408, the process 400 determines a volume of a different portion of the speech corresponding to when the user is not speaking the predefined word or phrase. This may include speech before and/or after the user speaking the predefined word or phrase.

At 410, the process 400 compares the first volume to the second volume and, at 412, determines whether the difference or the ratio between these calculated volumes is greater than a threshold. At 414, the process 400 may instruct an apparatus to perform an operation at least partly in response to the difference or ratio being greater than the threshold. For instance, the process 400 may adjust (e.g., increase) the similarity score between the speech that includes the predefined word or phrase and the predefined word or phrase itself, such that a speech-recognition engine now designates the speech as including the word or phrase. The operation, meanwhile, may include instructing the apparatus to transition to a different operational state, turning on or off a portion of the apparatus, altering a setting of the apparatus, or an instruction to perform any other action. Again, while this example describes referencing a ratio, the volume level(s) may be utilized in any other way to determine whether to transition the device to a different state. At 416, meanwhile, the process 400 may refrain from instructing the apparatus to perform the operation when the difference or ratio between the volumes is not greater than the threshold.

Figure 5:
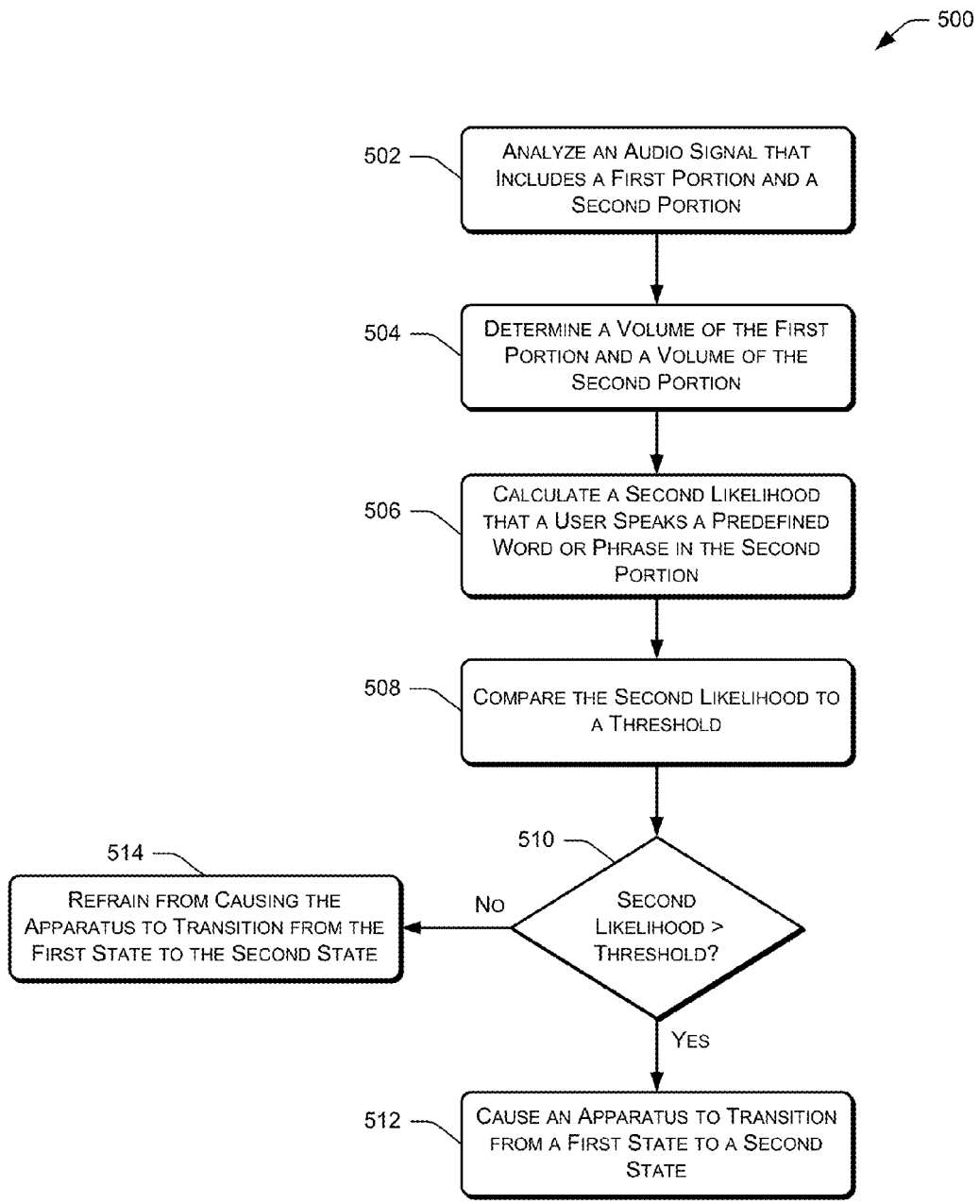
FIG. 5 illustrates a flow diagram of another example process for causing an apparatus to transition from one state to another at least in part due to a user raising her voice when speaking a predefined word or phrase.

FIG. 5 illustrates a flow diagram of another example process 500 for causing an apparatus to transition from one state to another at least in part due to a user raising her voice when speaking a predefined word or phrase. At 502, the process 500 analyzes an audio signal that includes a first portion and a second portion. In this example, the process 500 calculates a first similarity score (e.g., a likelihood) that the second portion of the speech includes a predefined utterance. In this example, this first likelihood is greater than a threshold, meaning that it is likely that the second portion includes the user speaking the predefined utterance. In addition, the process 500 calculates a first likelihood that the first portion includes the predefined utterance. In this example, this likelihood is less than the threshold, meaning that the user likely did not speak the predefined utterance in the first portion of speech.

At 504, the process 500 determines a volume of the first portion and a volume of the second portion. At 506, the process 500 calculates a second likelihood that the second portion includes the predefined utterance, with this second likelihood being based on the first likelihood associated with the second portion and the volume levels determined at 504. For instance, the second likelihood may be calculated based at least in part on the ratio, the difference, or the like between the volume level of the second portion and the volume level of the first portion. For instance, if this ratio or difference is quite large, meaning that the user raised his or her voice when she spoke the second portion of speech, then the second likelihood that the second portion includes the predefined utterance may be relatively great. As with each similarity score described herein, this similarity may be calculated using machine learning techniques, neural networks, support vector machines (SVMs), or the like.

At 508, the process 500 then compares this second likelihood to a threshold and, at 510, determines whether the likelihood is greater than the threshold. If so, then at 512 the process 500 causes the apparatus to transition from a first state to a second state. If not, however, then at 514 the process 500 refrains from causing the apparatus from transitioning between states.

Figure 6:
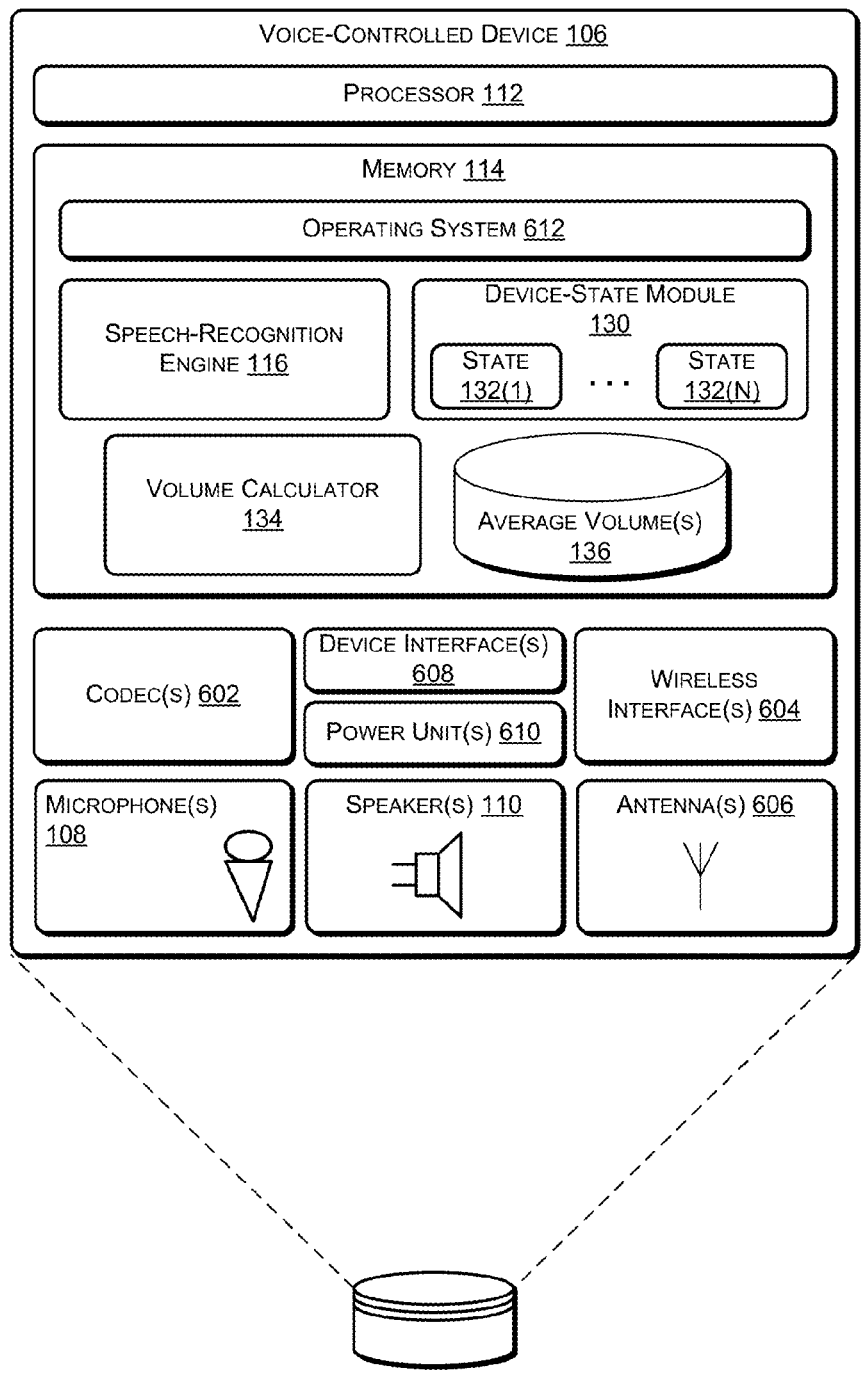
FIG. 6 shows a block diagram of selected functional components implemented in the voice-controlled device of FIG. 1.

FIG. 6 shows a block diagram of selected functional components implemented in the voice-controlled device 106 of FIG. 1. While this figure illustrates one example device, it is to be appreciated that any other type of client or server computing device may implement the techniques described herein.

Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 112 and memory 114. The memory 114 may include computer-readable storage media ("CRSM"), which may be any available physical media accessible by the processor 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 includes the microphone unit 108 that comprises one or more microphones to receive audio input, such as user voice input. The device 106 also includes the speaker unit 110 that includes one or more speakers to output audio sounds. One or more codecs 602 are coupled to the microphone unit 108 and the speaker unit 110 to encode and/or decode the audio signals. The codec may convert audio data between analog and digital formats. A user may interact with the device 106 by speaking to it and the microphone unit 108 captures sound and generates an audio signal that includes the user speech. The codec 602 encodes the user speech and transfers that audio data to other components. The device 106 can communicate back to the user by emitting audible statements through the speaker unit 110. In this manner, the user interacts with the voice-controlled device simply through speech, without use of a keyboard or display common to other types of devices.

In the illustrated example, the voice-controlled device 106 includes one or more wireless interfaces 604 coupled to one or more antennas 606 to facilitate a wireless connection to a network. The wireless interface 604 may implement one or more of various wireless technologies, such as wifi, Bluetooth, RF, and so on.

One or more device interfaces 608 (e.g., USB, broadband connection, etc.) may further be provided as part of the device 106 to facilitate a wired connection to a network, or a plug-in network device that communicates with other wireless networks. One or more power units 610 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to effectively indicate when the device believes that the user may be attempting to cause the device to transition between device states. But, otherwise, the device 106 does not use or need to use any input devices or displays in some instances.

Several modules such as instruction, datastores, and so forth may be stored within the memory 114 and configured to execute on the processor 112. An operating system module 612 is configured to manage hardware and services (e.g., wireless unit, Codec, etc.) within and coupled to the device 106 for the benefit of other modules. In addition, the memory 114 may include the speech-recognition engine 116, described above, amongst other modules. Some or all of these modules, data stores, and components may reside additionally or alternatively at the remote computing resources 118.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus comprising:
   a microphone unit;
   one or more processors; and one or more computer-readable media storing computer-executable instructions that, when executed by the one or more processors, cause the one or more processors to perform acts comprising:
  receiving an audio signal from the microphone unit, the audio signal including a first portion of speech and a second portion of speech subsequent to the first portion, the second portion including a predefined word or phrase;
  calculating a volume of the first portion;
  calculating a volume of the second portion;
  determining a first score indicating a similarity between the second portion of speech and the predefined word or phrase; and
  determining a second score based at least in part on the first score, the volume of the first portion, and the volume of the second portion; and
  causing the apparatus to transition from a first state to a second state at least partly in response to determining that second score is greater than a threshold.

2. An apparatus as recited in claim 1, wherein:
the first portion comprises a first set of multiple frames;
the volume of the first portion comprises an average volume of the first set of multiple frames;
the second portion comprises a second set of multiple frames; and
the volume of the second portion comprises an average volume of the second set of multiple frames.

3. An apparatus as recited in claim 1, wherein the apparatus performs more functionality in the second state than in the first state.

4. An apparatus as recited in claim 1, wherein the apparatus provides audio signals generated by the microphone unit to one or more remote computing devices when in the second state and does not provide audio signals generated by the microphone unit to the one or more remote computing devices when in the first state.

5. An apparatus as recited in claim 1, wherein the volume of the second portion is calculated at least partly in response to determining that the first score is greater than another threshold.

6. One or more non-transitory computer-readable media storing computer-executable instructions that, when executed by one or more processors, cause the one or more processors to perform acts comprising:
  determining a first score indicating a similarity between (i) an audio signal that includes speech from a user, and (ii) a predefined word or phrase;
  determining a first volume of a first portion of the audio signal;
  determining a second volume of a second portion of the audio signal;
  determining a second score based at least in part on the first score, the first volume, and the second volume; and
  instructing an apparatus to perform an operation based at least in part on the second score.

7. One or more non-transitory computer-readable media as recited in claim 6, wherein the second volume corresponds to speech prior to the user speaking the predefined word or phrase.

8. One or more non-transitory computer-readable media as recited in claim 6, wherein determining the second score comprises adjusting the first score based at least in part on the first volume and the second volume.

9. One or more non-transitory computer-readable media as recited in claim 6, wherein the second score is determined based at least in part on a ratio or a difference between the first volume and the second volume.

10. One or more non-transitory computer-readable media as recited in claim 6, wherein the second score is determined using a neural network or a support vector machine (SVM).

11. One or more non-transitory computer-readable media as recited in claim 6, the acts further comprising determining whether a ratio of the first volume to the second volume is greater than a threshold, and wherein the instructing the apparatus to perform the apparatus is also based at least in part on determining that the ratio is greater than the threshold.

12. One or more non-transitory computer-readable media as recited in claim 6, wherein instructing the apparatus to perform the operation comprises instructing the apparatus to transition from a first state to a second state.

13. One or more non-transitory computer-readable media as recited in claim 12, wherein the apparatus provides audio signals to one or more remote computing resources when in the second state, but not when in the first state.

14. One or more non-transitory computer-readable media as recited in claim 12, wherein the apparatus performs speech recognition when operating in the second state.

15. One or more non-transitory computer-readable media as recited in claim 6, wherein:
  determining the first volume comprises determining an average volume of a first set of multiple frames of the audio signal; and
  determining the second volume comprises determining an average volume of a second set of multiple frames of the audio signal.

16. One or more non-transitory computer-readable media as recited claim 15, wherein determining the first volume comprises excluding frames of the first set of multiple frames that do not include speech.

17. One or more non-transitory computer-readable media as recited in claim 6, wherein the first score is determined at least partly using a Hidden Markov Model (HMM) and a Gaussian mixture model.

18. A method comprising:
  under control of one or more computing devices that include executable instructions,
  analyzing a first portion of an audio signal to determine a first score indicating a similarity between the first portion of the audio signal and a predefined word or phrase;
  determining a volume of the first portion of the audio signal and a volume of a second portion of the audio signal; and
  calculating a second score based at least in part on the first score, the volume of the first portion, and the volume of the second portion.

19. A method as recited in claim 18, further comprising:
  comparing the second score to a threshold; and
  instructing an apparatus to perform an operation at least partly in response to determining that the second score is greater than the threshold.

20. A method as recited in claim 18, further comprising:
  comparing the second score a threshold; and
  causing the apparatus to transition from a first state to a second state at least partly in response to determining that the second score is greater than the second threshold.

21. A method as recited in claim 20, wherein the one or more computing devices provide audio signals to one or more remote computing resources when in the second state, but not when in the first state.

22. A method as recited in claim 18, wherein:
  the one or more computing devices comprise an apparatus within an environment in which the speech occurs; or the one or more computing devices form a portion of a network-accessible computing platform that is remote from the environment in which the speech occurs.

23. A method as recited in claim 18, wherein the first score is determined at least partly using a Hidden Markov Model (HMM) and a Gaussian mixture model.

24. A method as recited in claim 18, wherein calculating the second score comprises adjusting the first score based at least in part on the volume of the first portion and the volume of the second portion.

25. A method as recited in claim 18, wherein the second score is calculated based at least in part on a ratio or a difference between the volume of the first portion and the volume of the second portion.

26. A method as recited in claim 18, wherein the second score is calculated using a neural network or a support vector machine (SVM).

\* \* \* \* \*